Patented Nov. 28, 1933

1,937,229

UNITED STATES PATENT OFFICE 1,937,229

PROCESS OF CLEANING AND DISINFECTING METALLIC ARTICLES

Hermann Kantorowicz, Berlin-Weissensee, Germany

No Drawing. Application December 16, 1930, Serial No. 502,868, and in Germany December 24, 1929

2 Claims. (Cl. 87—5)

The extraordinarily good germicidal action of sodium hypochlorite is known. For this reason solutions of hypochlorites are frequently employed for the disinfection and cleaning, in particular, of metal utensils, instruments and objects such as are employed in dairying, in brewing and for sick nursing, particularly in hospitals. Hypochlorite solution has, however, the disadvantage that metals are strongly attacked and that the hypochlorites react upon metals almost explosively. In this way not only does damage of the objects frequently arise, but the solution itself is subsequently useless.

To increase the cleaning capacity and also for a better removal of the fat adhering to vessels undergoing treatment, caustic soda has been added to hypochlorite solution. The germicidal action of such a mixture is indeed superior. Nevertheless, such a solution is also not satisfactory, as metals, particularly tin and aluminium, are so strongly attacked by the chlorine and by the excess of caustic soda that the durability of the objects treated is considerably reduced.

I have now found that the good properties of hypochlorite solution may be entirely retained while the described disadvantages are caused wholly to disappear if an addition of waterglass thereto is made. Thorough and lengthy observations carried out have shown that such a hypochlorite solution containing waterglass hardly attacks metals at all, and that the reactions observed with chlorine solution without these additions do not take place. The action is probably to be ascribed to the fact that the waterglass contained in the liquid mixture acts as a colloidal protective layer for the metal and as a result prevents chemical reaction between the metal and the chlorine solution.

It has already been suggested to obtain solid solutions of alkali hypochlorite by evaporating and stirring a waterglass solution until a semisolid solution results to which the sodium hypochlorite solution is added, or to obtain a mixture of sodium hypochlorite, waterglass and calcined soda. The product would be unsatisfactory for the present purpose, since waterglass contained in these solid solutions cannot again be brought into solution, so that it is unable to exert any protective action with respect to metals.

Further, it has also been suggested to employ colloidal silicic acid gel as an agent for the production of a hypochlorite-containing antiseptic of salve form. Also in this form the possibility of the production of a silicic acid salt soluble in water does not exist.

According to the invention, the addition of waterglass, which can be made in the form of potassium or sodium waterglass, takes place preferably in such proportions that no precipitate results.

The disinfecting agent is for example obtained in the following manner:

A mixture of 562 grams of sodium hypochlorite solution of specific gravity 1.125 and 250 grams of caustic soda solution of specific gravity 1.383 (about 11%) is prepared. 500 grams of this solution are admixed with 300 grams of sodium waterglass of 38/40° Bé. This forms a concentrated solution which can be diluted for use in cleaning or disinfecting.

For the purpose of disinfection the concentrated solution is employed in suitable dilution. For obtaining the best results, solutions which contain ¼ to 2% of the concentrated liquid can be employed.

The protective action of the waterglass towards the metal can be employed in the production of disinfecting agents which are produced from solutions of alkali or alkaline earth hypochlorites alone or from solutions of hypochlorites and caustic alkalies.

The disinfecting and cleaning agents can not only be employed with advantage for the treatment of utensils and the like for dairying, brewing and butchery as well as for sick nursing, but serve equally, in particular, for the cleaning of flasks which beer, wine, mineral water and other beverages have been contained and for the metal parts of the instruments and machines necessary for the cleaning.

I claim:—

1. A process which comprises subjecting metallic articles, utensils, receptacles and the like, to contact with a solution of a hypochlorite and an alkali metal silicate.

2. A process which comprises subjecting metallic articles, utensils, receptacles and the like, to contact with a solution of a hypochlorite, an alkali metal silicate and a caustic alkali.

HERMANN KANTOROWICZ.